(12) United States Patent
Ma et al.

(10) Patent No.: US 9,978,371 B2
(45) Date of Patent: May 22, 2018

(54) TEXT CONVERSION METHOD AND DEVICE

(71) Applicant: Huawei Technologies Co., Ltd., Shenzhen (CN)

(72) Inventors: Lin Ma, Hong Kong (HK); Weibin Zhang, Hong Kong (HK); Pascale Fung, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 14/980,400

(22) Filed: Dec. 28, 2015

(65) Prior Publication Data
US 2016/0203819 A1    Jul. 14, 2016

(30) Foreign Application Priority Data

Jan. 13, 2015   (CN) .......................... 2015 1 0017057

(51) Int. Cl.
*G10L 15/26* (2006.01)
*G10L 15/193* (2013.01)
*G06F 17/27* (2006.01)
*G10L 15/02* (2006.01)

(52) U.S. Cl.
CPC .......... *G10L 15/26* (2013.01); *G06F 17/2755* (2013.01); *G06F 17/2775* (2013.01); *G10L 15/02* (2013.01); *G10L 15/193* (2013.01)

(58) Field of Classification Search
CPC ... G10L 15/26; G10L 15/193; G06F 17/2755; G06F 17/2775

USPC ......................................................... 704/235
See application file for complete search history.

(56) References Cited

U.S. PATENT DOCUMENTS

| | | | |
|---|---|---|---|
| 5,781,884 A | 7/1998 | Pereira et al. | |
| 7,133,513 B1* | 11/2006 | Zhang | H04M 3/42221 379/202.01 |
| 7,778,944 B2 | 8/2010 | Bangalore | |
| 8,095,356 B2 | 1/2012 | Kempe et al. | |
| 9,075,792 B2* | 7/2015 | Dai | G06F 17/2755 |
| 9,672,810 B2* | 6/2017 | Hofer | G10L 15/02 |

(Continued)

OTHER PUBLICATIONS

Lease et al ("Recognizing Disfluencies in Conversational Speech" IEEE Transactions on Audio, Speech, and Language Processing, vol. 14 No. 5 Sep. 2006, pp. 1566-1573.*

(Continued)

*Primary Examiner* — Daniel C Washburn
*Assistant Examiner* — Oluwadamilola M Ogunbiyi
(74) *Attorney, Agent, or Firm* — Conley Rose, P.C.

(57) ABSTRACT

The method includes acquiring a target spoken text, where the target spoken text includes a non-spoken morpheme and a spoken morpheme; determining, from a target weighted finite-state transducer (WFST) model database, a target WFST model corresponding to the target spoken text, where output of a state that is corresponding to the spoken morpheme and that is in the target WFST model is empty, and output and input of a state that is corresponding to the non-spoken morpheme and that is in the target WFST model are the same; and determining, according to the target WFST model, a written text corresponding to the target spoken text, where the written text includes the non-spoken morpheme and does not include the spoken morpheme.

6 Claims, 7 Drawing Sheets

(56) References Cited

U.S. PATENT DOCUMENTS

| | | | |
|---|---|---|---|
| 2002/0091512 A1* | 7/2002 | Karttunen | G10L 15/193 704/202 |
| 2004/0034656 A1* | 2/2004 | Beesley | G06F 17/2755 |
| 2007/0078642 A1* | 4/2007 | Weng | G10L 15/1822 704/4 |
| 2007/0225977 A1* | 9/2007 | Emam | G06F 17/2863 704/235 |
| 2008/0046229 A1* | 2/2008 | Maskey | G06F 17/2775 704/2 |
| 2008/0154835 A1* | 6/2008 | Beesley | G06F 17/273 706/48 |
| 2010/0217596 A1* | 8/2010 | Morris | G10L 15/10 704/251 |
| 2012/0046939 A1 | 2/2012 | Mohri et al. | |
| 2014/0214416 A1* | 7/2014 | Yue | G10L 15/14 704/231 |
| 2014/0229177 A1* | 8/2014 | Kanthak | G10L 15/083 704/236 |
| 2015/0154173 A1* | 6/2015 | Kim | G06F 17/274 704/9 |
| 2016/0078020 A1* | 3/2016 | Sumita | G06F 17/289 704/9 |
| 2016/0093292 A1* | 3/2016 | Hofer | G10L 15/02 704/240 |

OTHER PUBLICATIONS

Melinamath et al, "A Morphological Generator for Kannada Based on Finite State Transducers," 3rd International Conference on Electronics Computer Technology, 2011, pp. 312-316. <doi: 10.1109/ICECTECH.2011.5941613>.*

Szarvas et al, "Finite-state transducer based modeling of morphosyntax with applications to Hungarian LVCSR," Proceedings on Acoustics, Speech, and Signal Processing, 2003, vol. 1, pp. I-368-I-371. <doi: 10.1109/ICASSP.2003.1198794>.*

* cited by examiner um: um

I: I use: use

TEXT CONVERSION METHOD AND DEVICE

CROSS-REFERENCE TO RELATED APPLICATION

This application claims priority to Chinese Patent Application No. 201510017057.7, filed on Jan. 13, 2015, which is hereby incorporated by reference in its entirety.

TECHNICAL FIELD

Embodiments of the present disclosure relate to the field of information technologies, and more specifically, to a text conversion method and device.

BACKGROUND

Spoken language, as oral language used in informal occasions (for example, a daily conversation, an informal speech, and informal document writing), has features of informality, flexibility, and the like. Written language, as language used in formal occasions (for example, a formal speech and formal document writing), has features of standardization, concision, and the like.

The spoken language does not have the features of concision, standardization, and the like as the written language, and therefore, in some occasions, using the spoken language is not conducive to spreading and exchange. For example, during machine translation, an input spoken text may fail to be accurately translated due to features, such as non-standardization, of the spoken language.

However, sometimes, it is inevitable to receive a spoken text. For example, when a speech recognition technology is applied to convert a voice into a text, an input voice is strictly converted into a corresponding text by using the speech recognition technology. If the input voice is a spoken speech, a corresponding recognition result is also a spoken text.

Therefore, how to convert a spoken text into a written text is an urgent problem to be resolved.

SUMMARY

Embodiments of the present disclosure provide a text conversion method and device, which can convert a spoken text into a written text, thereby facilitating spreading and exchange of a text.

According to a first aspect, an embodiment of the present disclosure provides a text conversion method, where the method includes acquiring a target spoken text, where the target spoken text includes a non-spoken morpheme and a spoken morpheme, and characteristics of the spoken morpheme include an inserted morpheme, a repeated morpheme, and an amending morpheme; determining, from a target weighted finite-state transducer (WFST) model database, a target WFST model corresponding to the target spoken text, where output of a state that is corresponding to the spoken morpheme and that is in the target WFST model is empty, and output and input of a state that is corresponding to the non-spoken morpheme and that is in the target WFST model are the same; and determining, according to the target WFST model, a written text corresponding to the target spoken text, where the written text includes the non-spoken morpheme and does not include the spoken morpheme.

With reference to the first aspect, in a first possible implementation manner of the first aspect, the target WFST model database is determined in the following manner. Determining an initial WFST model database according to a text training database by means of statistical learning, where the initial WFST model database includes N initial spoken WFST models corresponding to N spoken texts, each spoken text of the N spoken texts includes the spoken morpheme, the N spoken texts include the target spoken text, and output of a state of a spoken morpheme in each initial spoken WFST model of the N initial spoken WFST models is not empty; determining a spoken morpheme characteristic WFST model database according to a spoken morpheme training database and the characteristics of the spoken morpheme and by means of statistical learning, where output of states of the inserted morpheme, the repeated morpheme, and the amending morpheme that are in the spoken morpheme characteristic WFST model database is empty; modifying the N initial spoken WFST models in the initial WFST model database according to the spoken morpheme characteristic WFST model database, to determine N modified spoken WFST models, where output of a state of a spoken morpheme in each WFST model of the N modified WFST models is empty; and determining the target WFST model database, where the target WFST model database includes the N modified spoken WFST models.

With reference to the first possible implementation manner of the first aspect, in a second possible implementation manner of the first aspect, the modifying the N initial spoken WFST models in the initial WFST model database according to the spoken morpheme characteristic WFST model database, to determine N modified spoken WFST models includes determining the spoken morpheme in each initial spoken WFST model; determining, from the spoken morpheme characteristic WFST model database, a spoken morpheme characteristic WFST model of each spoken morpheme in each initial spoken WFST model; and combining each initial spoken WFST model with the spoken morpheme characteristic WFST model of each spoken morpheme in each initial spoken WFST model, to determine each modified spoken WFST model.

According to a second aspect, an embodiment of the present disclosure provides a text conversion device, where the device includes an acquiring unit configured to acquire a target spoken text, where the target spoken text includes a spoken morpheme and a non-spoken morpheme, and characteristics of the spoken morpheme include an inserted morpheme, a repeated morpheme, and an amending morpheme; and a determining unit configured to determine, from a target WFST model database, a target WFST model corresponding to the target spoken text, where output of a state that is corresponding to the spoken morpheme and that is in the target WFST model is empty, and output and input of a state that is corresponding to the non-spoken morpheme and that is in the target WFST model are the same, where the determining unit is further configured to determine, according to the target WFST model, a written text corresponding to the target spoken text, where the written text includes the non-spoken morpheme and does not include the spoken morpheme.

With reference to the second aspect, in a first possible implementation manner of the second aspect, the determining unit is further configured to determine the target WFST model database.

With reference to the first possible implementation manner of the second aspect, in a second possible implementation manner of the second aspect, the determining unit is configured to determine an initial WFST model database according to a text training database by means of statistical learning, where the initial WFST model database includes N initial spoken WFST models corresponding to N spoken texts, each spoken text of the N spoken texts includes the spoken morpheme, the N spoken texts include the target spoken text, and output of a state of a spoken morpheme in each initial spoken WFST model of the N initial spoken WFST models is not empty; determine a spoken morpheme characteristic WFST model database according to a spoken morpheme training database and the characteristics of the spoken morpheme and by means of statistical learning, where output of states of the inserted morpheme, the repeated morpheme, and the amending morpheme that are in the spoken morpheme characteristic WFST model database is empty; modify the N initial spoken WFST models in the initial WFST model database according to the spoken morpheme characteristic WFST model database, to determine N modified spoken WFST models, where output of a state of a spoken morpheme in each WFST model of the N modified WFST models is empty; and determine the target WFST model database, where the target WFST model database includes the N modified spoken WFST models.

With reference to the second possible implementation manner of the second aspect, in a third possible implementation manner of the second aspect, the determining unit is configured to determine the spoken morpheme in each initial spoken WFST model; determine, from the spoken morpheme characteristic WFST model database, a spoken morpheme characteristic WFST model of each spoken morpheme in each initial spoken WFST model; and combine each initial spoken WFST model with the spoken morpheme characteristic WFST model of each spoken morpheme in each initial spoken WFST model, to determine each modified spoken WFST model.

According to a third aspect, an embodiment of the present disclosure provides a text conversion device, where the device includes a storage unit configured to store a text training database and a spoken morpheme training database; and a determining unit configured to determine an initial WFST model database according to the text training database by means of statistical learning, where the initial WFST model database includes N initial spoken WFST models corresponding to N spoken texts, each spoken text of the N spoken texts includes a spoken morpheme, the N spoken texts include a target spoken text, and output of a state of a spoken morpheme in each initial spoken WFST model of the N initial spoken WFST models is not empty, where the determining unit is further configured to determine a spoken morpheme characteristic WFST model database according to the spoken morpheme training database and characteristics of the spoken morpheme and by means of statistical learning, where output of states of an inserted morpheme, a repeated morpheme, and an amending morpheme that are in the spoken morpheme characteristic WFST model database is empty; the determining unit is further configured to modify the N initial spoken WFST models in the initial WFST model database according to the spoken morpheme characteristic WFST model database, to determine N modified spoken WFST models, where output of a state of a spoken morpheme in each WFST model of the N modified WFST models is empty; and the determining unit is further configured to determine the target WFST model database, where the target WFST model database includes the N modified spoken WFST models.

With reference to the third aspect, in a first possible implementation manner of the third aspect, the determining unit is configured to determine the spoken morpheme in each initial spoken WFST model; determine, from the spoken morpheme characteristic WFST model database, a spoken morpheme characteristic WFST model corresponding to the spoken morpheme in each initial spoken WFST model; and combine each initial spoken WFST model with the spoken morpheme characteristic WFST model corresponding to the spoken morpheme in each initial spoken WFST model, to determine each modified spoken WFST model.

In the foregoing technical solution, after a spoken text is processed by a corresponding WFST model, a spoken morpheme that is of the spoken text and that has a spoken characteristic is removed. In this way, a written text becomes a text that does not have a spoken characteristic. Therefore, the foregoing technical solution can implement conversion from a spoken text to a written text.

BRIEF DESCRIPTION OF THE DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
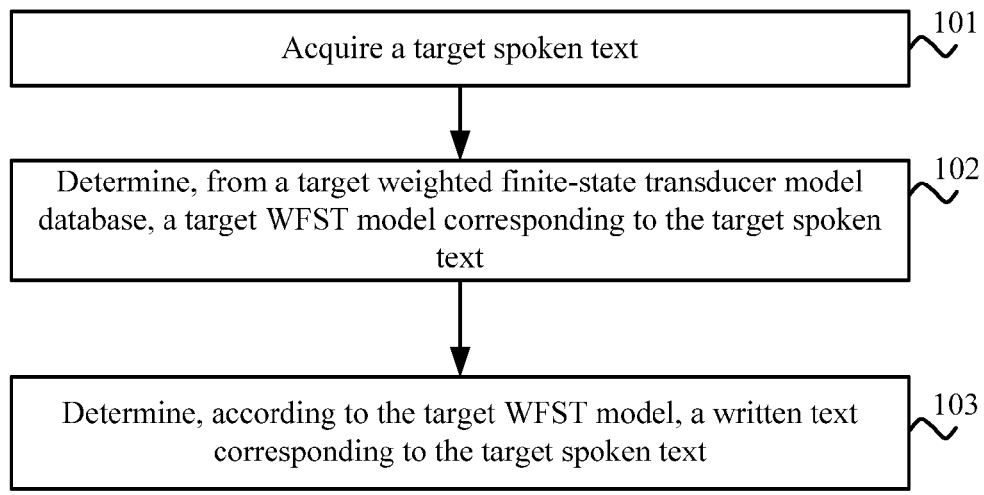
FIG. 1 is a schematic flowchart of a text conversion method according to an embodiment of the present disclosure.

FIG. 1 is a schematic flowchart of a text conversion method according to an embodiment of the present disclosure.

101: Acquire a target spoken text, where the target spoken text includes a non-spoken morpheme and a spoken morpheme, and characteristics of the spoken morpheme include an inserted morpheme, a repeated morpheme, and an amending morpheme.

102: Determine, from a target WFST model database, a target WFST model corresponding to the target spoken text, where output of a state that is corresponding to the spoken morpheme and that is in the target WFST model is empty, and output and input of a state that is corresponding to the non-spoken morpheme and that is in the target WFST model are the same.

103: Determine, according to the target WFST model, a written text corresponding to the target spoken text, where the written text includes the non-spoken morpheme and does not include the spoken morpheme.

According to the embodiment shown in FIG. 1, after a spoken text is processed by a corresponding WFST model, a spoken morpheme that is of the spoken text and that has a spoken characteristic is removed. In this way, a written text becomes a text that does not have a spoken characteristic. Therefore, according to the embodiment shown in FIG. 1, conversion from a spoken text to a written text can be implemented.

The target WFST model is determined in the following manner. Determining an initial WFST model database according to a text training database by means of statistical learning, where the initial WFST model database includes N initial spoken WFST models corresponding to N spoken texts, each spoken text of the N spoken texts includes the spoken morpheme, the N spoken texts include the target spoken text, and output of a state of a spoken morpheme in each initial spoken WFST model of the N initial spoken WFST models is not empty; determining a spoken morpheme characteristic WFST model database according to a spoken morpheme training database and the characteristics of the spoken morpheme and by means of statistical learning, where a characteristic of a spoken morpheme in the spoken morpheme characteristic WFST model database is that output of states of the inserted morpheme, the repeated morpheme, and the amending morpheme that are in the spoken morpheme characteristic WFST model database is empty; modifying the N initial spoken WFST models in the initial WFST model database according to the spoken morpheme characteristic WFST model database, to determine N modified spoken WFST models, where output of a state of a spoken morpheme in each WFST model of the N modified WFST models is empty; and determining the target WFST model database, where the target WFST model database includes the N modified spoken WFST models.

The text referred to in this specification is a complete sentence. The morpheme referred to in this specification may be an element that includes one or more characters, one or more words, or one or more characters and words. The morpheme referred to in this specification may be an element that can express a complete meaning, or may be an element that cannot express a complete meaning. A morpheme in a text may be classified as a spoken morpheme or a non-spoken morpheme. A non-spoken morpheme refers to a morpheme that is indispensable when a text correctly expresses a meaning, and a spoken morpheme refers to a morpheme that is dispensable when a text correctly expresses a meaning. That is, if a spoken morpheme in a text is removed, a meaning to be expressed by the text does not change; but if a non-spoken morpheme in a text is removed, the text cannot express a complete meaning or a meaning expressed by the text changes. For example, in a text "So, um, we will not encounter confusion", "um" is a spoken morpheme, and "so", "we", "will not", "encounter", and "confusion" are non-spoken morphemes.

Figure 2:
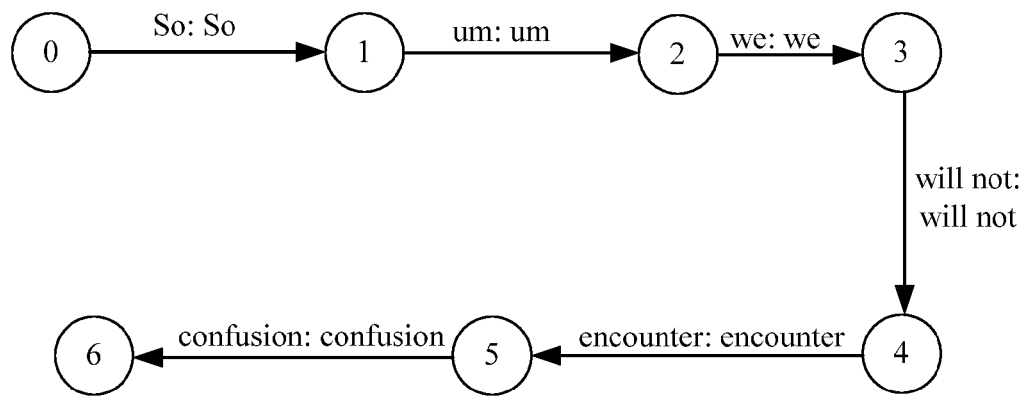
FIG. 2 is a schematic diagram of a WFST model.
Figure 3:
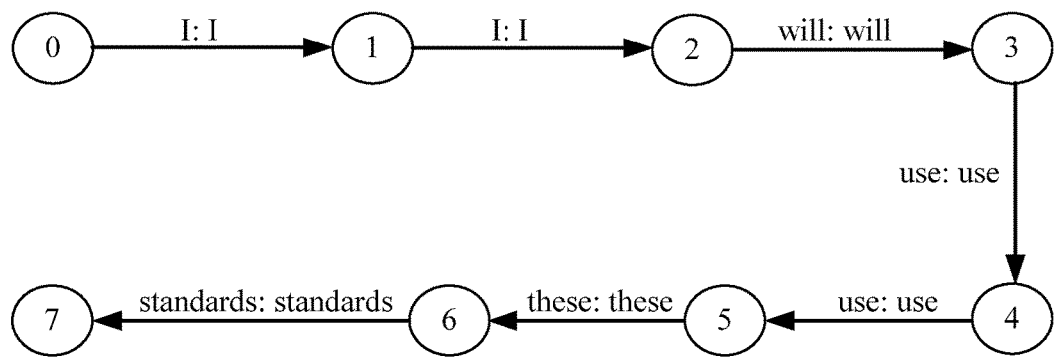
FIG. 3 is a schematic diagram of another WFST model.
Figure 4:
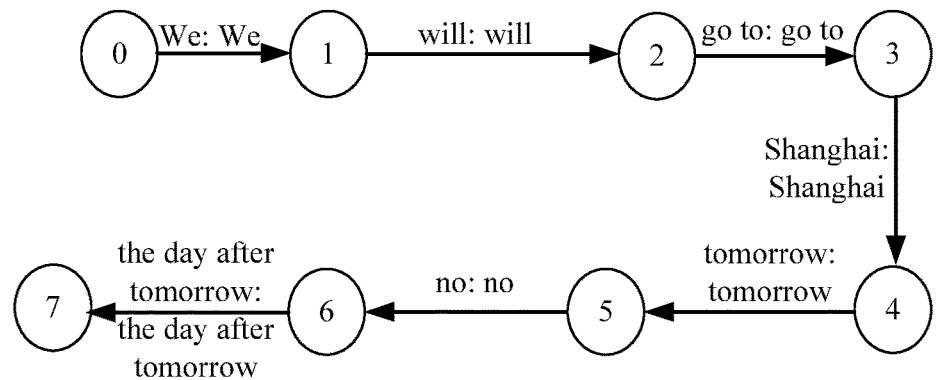
FIG. 4 is a schematic diagram of another WFST model.

The text training database includes multiple training texts. By means of statistical learning, each text may have one corresponding WFST model. A WFST model obtained according to a training text is called an initial WFST model. For example, a training text is "So, um, we will not encounter confusion", and an initial WFST model that is corresponding to the training text and that is shown in FIG. 2 may be obtained by means of statistical learning. For another example, a training text is "I, I will use, use these standards", and an initial WFST model that is corresponding to the training text and that is shown in FIG. 3 may be obtained. For still another example, a training text is "We will go to Shanghai tomorrow, no, the day after tomorrow", and an initial WFST model that is corresponding to the training text and that is shown in FIG. 4 may be obtained by means of statistical learning.

Figure 8:
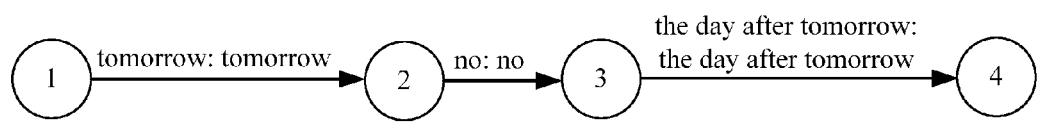
FIG. 8 is a schematic diagram of another WFST model.

Similar to the process of determining the initial WFST model database, a corresponding WFST model database may be determined according to the spoken morpheme training database by means of statistical learning. For example, the spoken morpheme is "um", and a WFST model shown in FIG. 5 may be determined. For another example, the spoken morpheme is "I, I", and a WFST model shown in FIG. 6 may be obtained; the spoken morpheme is "use, use", and a WFST model shown in FIG. 8 may be obtained. For still another example, the spoken morpheme is "tomorrow, no, the day after tomorrow", and a WFST model shown in FIG. 9 may be obtained.

Optionally, after the WFST model corresponding to the spoken morpheme is obtained, output of a state of a spoken morpheme whose spoken morpheme characteristics are the inserted morpheme, the repeated morpheme, and the amending morpheme may be set to empty according to the characteristics of the spoken morpheme, that is, the spoken morpheme characteristic WFST model is obtained. Spoken morphemes whose characteristic is the inserted morpheme may be some parentheses having no actual meaning, such as "ah", "oh", "hum", "this", and "that". Output of states in WFST models corresponding to these inserted morphemes may be set to empty. If a same morpheme repeats twice or more than twice, and this repetition has no actual meaning, it may be considered that one of such repeated morphemes may be a spoken morpheme having a repeated-morpheme characteristic. A repeated morpheme having no actual meaning refers to a morpheme that is not meaningful and that is not in idiomatic collocation, for example, repeated morphemes such as reduplicated words (such as liang jing jing, which means shiny) or some idiomatic words or idiomatic phrases (such as xu xu ru sheng, which means vivid). For example, in "I, I", "I" is repeated twice and this repetition has no actual meaning, and therefore, it may be determined one "I" of "I, I" is a spoken morpheme. For another example, in the text "use, use", "use" is repeated twice and this repetition has no actual meaning, and therefore, it may be determined one "use" of "use, use" is a spoken morpheme. Output of states that are in WFST models corresponding to these repeated morphemes may be set to empty. An actual meaning to be expressed by a morpheme having a characteristic of "morpheme 1+modifying word+morpheme 2" is the morpheme following the "modifying word", that is, "morpheme 2", where "morpheme 1" and "morpheme 2" may be nouns, verbs, quantifiers, or the like, and the "modifying word" may be a negative word or a word that can indicate a meaning of modification. In this case, "morpheme 1+modifying word" in the spoken morpheme having the characteristic of "morpheme 1+modifying word+morpheme 2" may be determined as a spoken morpheme with an amending-morpheme characteristic, and output of a state of the spoken morpheme is set to empty. For example, output of states of morphemes "tomorrow" and "no" in "tomorrow, no, the day after tomorrow" may be set to empty.

Further, the modifying the N initial spoken WFST models in the initial WFST model database according to the spoken morpheme characteristic WFST model database, to determine N modified spoken WFST models includes determining the spoken morpheme in each initial spoken WFST model; determining, from the spoken morpheme characteristic WFST model database, a spoken morpheme characteristic WFST model of each spoken morpheme in each initial spoken WFST model; and combining each initial spoken WFST model with the spoken morpheme characteristic WFST model of each spoken morpheme in each initial spoken WFST model, to determine each modified spoken WFST model. In this way, output of a state of a spoken morpheme that has the characteristics of the inserted morpheme, the repeated morpheme, and the amending morpheme and that is in the modified WFST model is empty, and output of a state of a non-spoken morpheme does not change (that is, the output is the same as input). In this case, when an input target spoken text is a spoken text having these characteristics, corresponding output is a written text excluding these characteristics, so that conversion from a spoken text to a written text may be implemented.

Figure 5:
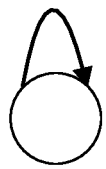
FIG. 5 is a schematic diagram of another WFST model.
Figure 6:
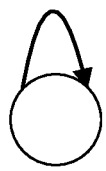
FIG. 6 is a schematic diagram of another WFST model.
Figure 7:
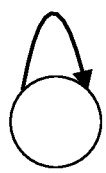
FIG. 7 is a schematic diagram of another WFST model.
Figure 9:
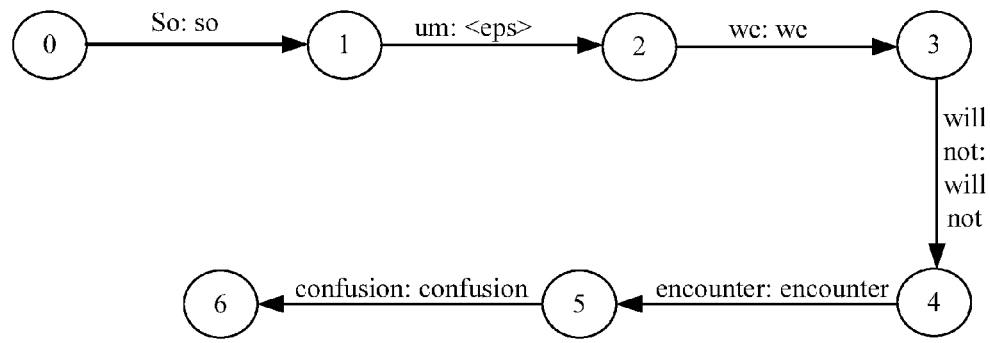
FIG. 9 is a schematic diagram of another WFST model.
Figure 10:
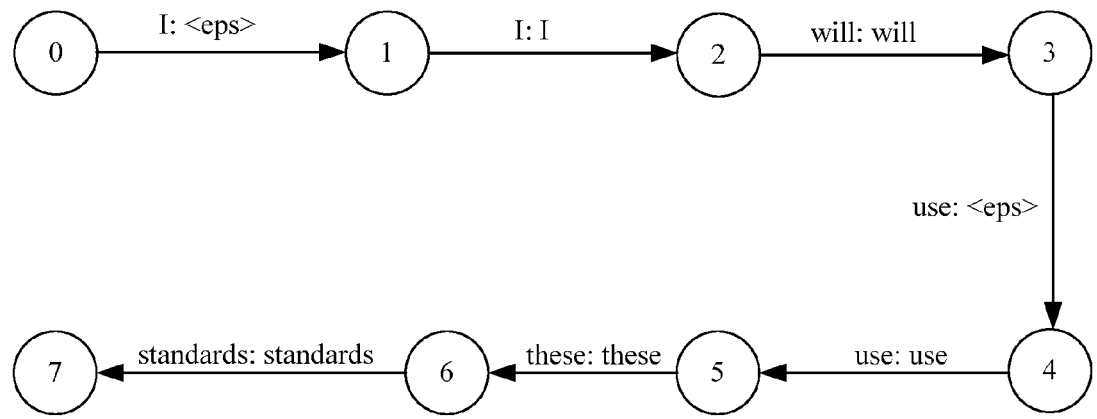
FIG. 10 is a schematic diagram of another WFST model.
Figure 11:
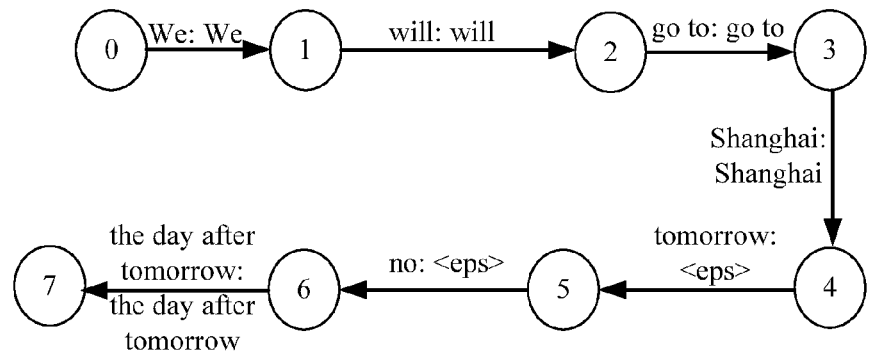
FIG. 11 is a schematic diagram of another WFST model.

For example, if the initial WFST model in the initial WFST model database is the initial WFST model shown in FIG. 2, the modified spoken WFST model shown in FIG. 9 may be obtained according to a corresponding spoken morpheme state WFST model (that is, a WFST model obtained by setting output of a state of a morpheme in the WFST model shown in FIG. 5 to empty). It can be seen that in the modified spoken WFST model shown in FIG. 9, output of a state of "um" is empty. In this way, when an input spoken text is "So, um, we will not encounter confusion", a corresponding target WFST model (that is, the WFST model shown in FIG. 9) may be found in the target WFST model database, and a written text, that is, "So, we will not encounter confusion" corresponding to the spoken text may be determined according to the target WFST model. For another example, if the initial WFST model in the initial WFST model database is the initial WFST model shown in FIG. 3, a modified spoken WFST model shown in FIG. 10 may be obtained according to a corresponding spoken morpheme state WFST model (that is, a WFST model obtained by setting output of a state of a morpheme in the WFST model shown in FIG. 6 and a state of a morpheme in a WFST model shown in FIG. 7 to empty). It can be seen that in the modified spoken WFST model shown in FIG. 10, output of states of one "I" of "I, I" and one "use" of "use, use" is empty. In this way, when an input spoken text is "I, I will use, use these standards", a corresponding target WFST model (that is, the WFST model shown in FIG. 10) may be found in the target WFST model database, and a written text, that is, "I will use these standards" corresponding to the spoken text may be determined according to the target WFST model. For another example, if the initial WFST model in the initial WFST model database is the initial WFST model shown in FIG. 4, a modified spoken WFST model shown in FIG. 11 may be obtained according to a corresponding spoken morpheme state WFST model (that is, a WFST model obtained by setting output of a state of a morpheme in the WFST model shown in FIG. 8 to empty). It can be seen that in the modified spoken WFST model shown in FIG. 11, output of states of "tomorrow" and "no" is empty. In this way, when an input spoken text is "We will go to Shanghai tomorrow, no, the day after tomorrow", a corresponding target WFST model (that is, the WFST model shown in FIG. 11) may be found in the target WFST model database, and a written text, that is, "We will go to Shanghai the day after tomorrow" corresponding to the spoken text may be determined according to the target WFST model.

In FIG. 2 to FIG. 11, an element preceding ":" represents input of a state, an element following ":" represents output of the state, and <eps>represents that the output of the state is empty.

Figure 12:
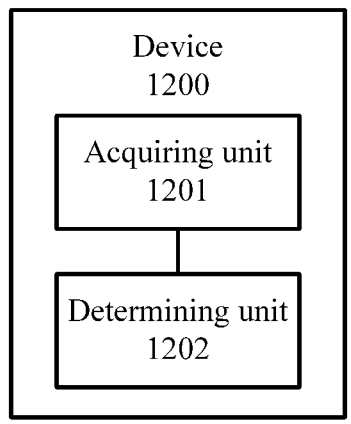
FIG. 12 is a structural block diagram of a text conversion device according to an embodiment of the present disclosure.

FIG. 12 is a structural block diagram of a text conversion device 1200 according to an embodiment of the present disclosure. The device shown in FIG. 12 can execute each step shown in FIG. 1. As shown in FIG. 12, the device 1200 includes an acquiring unit 1201 and a determining unit 1202.

The acquiring unit 1201 is configured to acquire a target spoken text, where the target spoken text includes a spoken morpheme and a non-spoken morpheme, and characteristics of the spoken morpheme include an inserted morpheme, a repeated morpheme, and an amending morpheme.

The determining unit 1202 is configured to determine, from a target WFST model database, a target WFST model corresponding to the target spoken text, where output of a state that is corresponding to the spoken morpheme and that is in the target WFST model is empty, and output and input of a state that is corresponding to the non-spoken morpheme and that is in the target WFST model are the same.

The determining unit 1202 is further configured to determine, according to the target WFST model, a written text corresponding to the target spoken text, where the written text includes the non-spoken morpheme and does not include the spoken morpheme.

After acquiring a spoken text, the device 1200 shown in FIG. 12 may remove a spoken morpheme that has a spoken characteristic from the spoken text. In this way, the device 1200 may determine the written text that does not have the spoken characteristic. Therefore, the device shown in FIG. 12 can implement conversion from a spoken text to a written text.

Optionally, the target WFST model database may be determined by the device 1200, or may be determined by another device. In a case in which the target WFST model database is determined by the device 1200, the determining unit 1202 may be configured to determine the target WFST model database.

The determining unit 1202 is configured to determine an initial WFST model database according to a text training database by means of statistical learning, where the initial WFST model database includes N initial spoken WFST models corresponding to N spoken texts, each spoken text of the N spoken texts includes the spoken morpheme, the N spoken texts include the target spoken text, and output of a state of a spoken morpheme in each initial spoken WFST model of the N initial spoken WFST models is not empty; determine a spoken morpheme characteristic WFST model database according to a spoken morpheme training database and the characteristics of the spoken morpheme and by means of statistical learning, where output of states of the inserted morpheme, the repeated morpheme, and the amending morpheme that are in the spoken morpheme characteristic WFST model database is empty; modify the N initial spoken WFST models in the initial WFST model database according to the spoken morpheme characteristic WFST model database, to determine N modified spoken WFST models, where output of a state of a spoken morpheme in each WFST model of the N modified WFST models is empty; and determine the target WFST model database, where the target WFST model database includes the N modified spoken WFST models.

Further, the determining unit 1202 may be configured to determine the spoken morpheme in each initial spoken WFST model; determine, from the spoken morpheme characteristic WFST model database, a spoken morpheme characteristic WFST model of each spoken morpheme in each initial spoken WFST model; and combine each initial spoken WFST model with the spoken morpheme characteristic WFST model of each spoken morpheme in each initial spoken WFST model, to determine each modified spoken WFST model.

Figure 13:
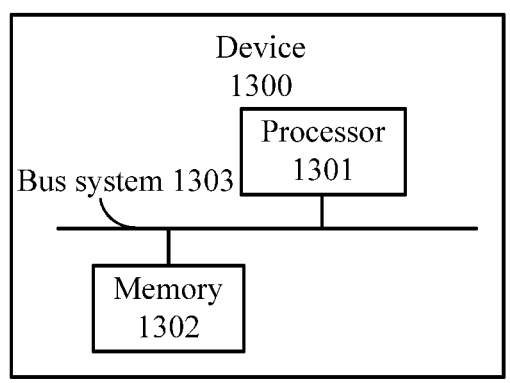
FIG. 13 is a structural block diagram of another text conversion device according to an embodiment of the present disclosure.

FIG. 13 is a structural block diagram of another text conversion device 1300 according to an embodiment of the present disclosure. The device shown in FIG. 13 can execute each step shown in FIG. 1. As shown in FIG. 13, the device 1300 includes a processor 1301 and a memory 1302.

Components of the device 1300 are coupled together by using a bus system 1303, where in addition to a data bus, the bus system 1303 includes a power bus, a control bus, and a status signal bus. However, for clear description, various types of buses in FIG. 13 are marked as the bus system 1303.

The method disclosed in the foregoing embodiment of the present disclosure may be applied to the processor 1301, or may be implemented by the processor 1301. The processor 1301 may be an integrated circuit chip having a signal processing capability. During implementation, the steps of the method may be performed by a hardware integrated logic circuit in the processor 1301 or by instructions in a form of software. The foregoing processor 1301 may be a general-purpose processor, a digital signal processor (DSP), an application-specific integrated circuit (ASIC), a field programmable gate array (FPGA), or another programmable logic device, discrete gate or transistor logic device, or discrete hardware assembly, which can implement or execute the method, the steps and logical block diagrams disclosed in the embodiments of the present disclosure. A general-purpose processor may be a microprocessor, or the processor may be any conventional processor and the like. The steps of the method disclosed in the embodiments of the present disclosure may be directly executed and completed by means of a hardware decoding processor, or may be executed and completed by using a combination of hardware and software modules in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 1302, and the processor 1301 reads an instruction in the memory 1302 and completes the steps in the foregoing method in combination with hardware of the processor 1301.

The processor 1301 is configured to acquire a target spoken text, where the target spoken text includes a spoken morpheme and a non-spoken morpheme, and characteristics of the spoken morpheme include an inserted morpheme, a repeated morpheme, and an amending morpheme.

The processor 1301 is configured to determine, from a target WFST model database, a target WFST model corresponding to the target spoken text, where output of a state that is corresponding to the spoken morpheme and that is in the target WFST model is empty, and output and input of a state that is corresponding to the non-spoken morpheme and that is in the target WFST model are the same.

The processor 1301 is further configured to determine, according to the target WFST model, a written text corresponding to the target spoken text, where the written text includes the non-spoken morpheme and does not include the spoken morpheme.

After acquiring a spoken text, the device 1300 shown in FIG. 13 may remove a spoken morpheme that has a spoken characteristic from the spoken text may be removed. In this way, the device 1300 may determine the written text that does not have the spoken characteristic. Therefore, the device shown in FIG. 13 can implement conversion from a spoken text to a written text.

Optionally, the target WFST model database may be determined by the device 1300, or may be determined by another device. In a case in which the target WFST model database is determined by the device 1300, the processor 1301 may be configured to determine the target WFST model database.

The processor 1301 is configured to determine an initial WFST model database according to a text training database by means of statistical learning, where the initial WFST model database includes N initial spoken WFST models corresponding to N spoken texts, each spoken text of the N spoken texts includes the spoken morpheme, the N spoken texts include the target spoken text, and output of a state of a spoken morpheme in each initial spoken WFST model of the N initial spoken WFST models is not empty; determine a spoken morpheme characteristic WFST model database according to a spoken morpheme training database by means of statistical learning and according to the characteristics of the spoken morpheme, where output of states of the inserted morpheme, the repeated morpheme, and the amending morpheme that are in the spoken morpheme characteristic WFST model database is empty; modify the N initial spoken WFST models in the initial WFST model database according to the spoken morpheme characteristic WFST model database, to determine N modified spoken WFST models, where output of a state of a spoken morpheme in each WFST model of the N modified WFST models is empty; and determine the target WFST model database, where the target WFST model database includes the N modified spoken WFST models.

Further, the processor 1301 may be configured to determine the spoken morpheme in each initial spoken WFST model; determine, from the spoken morpheme characteristic WFST model database, a spoken morpheme characteristic WFST model of each spoken morpheme in each initial spoken WFST model; and combine each initial spoken WFST model with the spoken morpheme characteristic WFST model of each spoken morpheme in each initial spoken WFST model, to determine each modified spoken WFST model.

Figure 14:
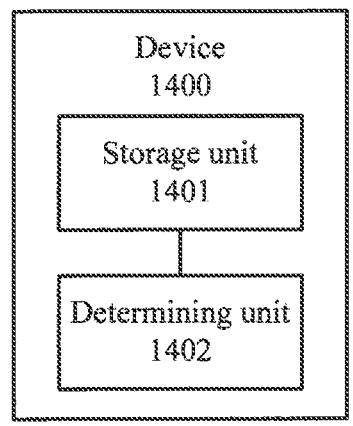
FIG. 14 is a structural block diagram of another text conversion device according to an embodiment of the present disclosure.

FIG. 14 is a structural block diagram of another text conversion device 1400 according to an embodiment of the present disclosure. The device shown in FIG. 14 may be configured to determine a target WFST model database, so that the device shown in FIG. 12 executes a text conversion operation according to the WFST model database. As shown in FIG. 14, the device 1400 includes a storage unit 1401 and a determining unit 1402.

The storage unit 1401 is configured to store a text training database and a spoken morpheme training database.

The determining unit 1402 is configured to determine an initial WFST model database according to the text training database by means of statistical learning, where the initial WFST model database includes N initial spoken WFST models corresponding to N spoken texts, each spoken text of the N spoken texts includes a spoken morpheme, the N spoken texts include a target spoken text, and output of a state of a spoken morpheme in each initial spoken WFST model of the N initial spoken WFST models is not empty.

The determining unit 1402 is further configured to determine a spoken morpheme characteristic WFST model database according to the spoken morpheme training database and characteristics of the spoken morpheme and by means of statistical learning, where output of states of an inserted morpheme, a repeated morpheme, and an amending morpheme that are in the spoken morpheme characteristic WFST model database is empty.

The determining unit 1402 is further configured to modify the N initial spoken WFST models in the initial WFST model database according to the spoken morpheme characteristic WFST model database, to determine N modified spoken WFST models, where output of a state of a spoken morpheme in each WFST model of the N modified WFST models is empty.

The determining unit 1402 is further configured to determine the target WFST model database, where the target WFST model database includes the N modified spoken WFST models.

The device shown in FIG. 14 can determine a target WFST model. In this way, the device shown in FIG. 12 may perform conversion from a spoken text to a written text according to the target WFST model determined by the device shown in FIG. 14.

Further, the determining unit 1402 is configured to determine the spoken morpheme in each initial spoken WFST model; determine, from the spoken morpheme characteristic WFST model database, a spoken morpheme characteristic WFST model corresponding to the spoken morpheme in each initial spoken WFST model; and combine each initial spoken WFST model with the spoken morpheme characteristic WFST model corresponding to the spoken morpheme in each initial spoken WFST model, to determine each modified spoken WFST model.

Figure 15:
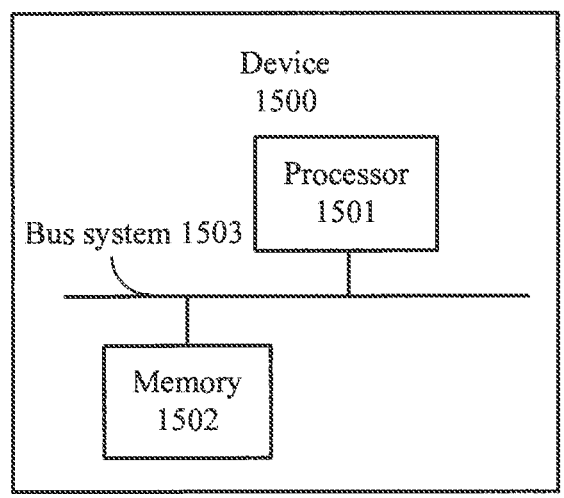
FIG. 15 is a structural block diagram of another text conversion device according to an embodiment of the present disclosure.

FIG. 15 is a structural block diagram of another text conversion device 1500 according to an embodiment of the present disclosure. The device shown in FIG. 15 may be configured to determine a target WFST model database, so that the device shown in FIG. 13 executes a text conversion operation according to the WFST model database. As shown in FIG. 15, the device 1500 includes a processor 1501 and a memory 1502.

Components of the device 1500 are coupled together by using a bus system 1503, where in addition to a data bus, the bus system 1503 includes a power bus, a control bus, and a status signal bus. However, for clear description, various types of buses in FIG. 15 are marked as the bus system 1503.

The method disclosed in the foregoing embodiment of the present disclosure may be applied to the processor 1501, or may be implemented by the processor 1501. The processor 1501 may be an integrated circuit chip having a signal processing capability. During implementation, the steps of the method may be performed by a hardware integrated logic circuit in the processor 1501 or by instructions in a form of software. The foregoing processor 1501 may be a general-purpose processor, a DSP, an ASIC, an FPGA, or another programmable logic device, discrete gate or transistor logic device, or discrete hardware assembly, which can implement or execute the method, the steps and logical block diagrams disclosed in the embodiments of the present disclosure. A general-purpose processor may be a microprocessor, or the processor may be any conventional processor and the like. The steps of the method disclosed in the embodiments of the present disclosure may be directly executed and completed by means of a hardware decoding processor, or may be executed and completed by using a combination of hardware and software modules in a decoding processor. The software module may be located in a mature storage medium in the art, such as a RAM, a flash memory, a ROM, a programmable read-only memory, an electrically erasable programmable memory, or a register. The storage medium is located in the memory 1502, and the processor 1501 reads an instruction in the memory 1502 and completes the steps in the foregoing method in combination with hardware of the processor 1501.

The memory 1502 may be further configured to store a text training database and a spoken morpheme training database.

The processor 1501 is configured to determine an initial WFST model database according to the text training database by means of statistical learning, where the initial WFST model database includes N initial spoken WFST models corresponding to N spoken texts, each spoken text of the N spoken texts includes a spoken morpheme, the N spoken texts include a target spoken text, and output of a state of a spoken morpheme in each initial spoken WFST model of the N initial spoken WFST models is not empty.

The processor 1501 is further configured to determine a spoken morpheme characteristic WFST model database according to the spoken morpheme training database and characteristics of the spoken morpheme and by means of statistical learning, where output of states of an inserted morpheme, a repeated morpheme, and an amending morpheme that are in the spoken morpheme characteristic WFST model database is empty.

The processor 1501 is further configured to modify the N initial spoken WFST models in the initial WFST model database according to the spoken morpheme characteristic WFST model database, to determine N modified spoken WFST models, where output of a state of a spoken morpheme in each WFST model of the N modified WFST models is empty.

The processor 1501 is further configured to determine the target WFST model database, where the target WFST model database includes the N modified spoken WFST models.

The device shown in FIG. 15 can determine a target WFST model. In this way, the device shown in FIG. 13 may perform conversion from a spoken text to a written text according to the target WFST model determined by the device shown in FIG. 15.

Further, the processor 1501 is configured to determine the spoken morpheme in each initial spoken WFST model; determine, from the spoken morpheme characteristic WFST model database, a spoken morpheme characteristic WFST model corresponding to the spoken morpheme in each initial spoken WFST model; and combine each initial spoken WFST model with the spoken morpheme characteristic WFST model corresponding to the spoken morpheme in each initial spoken WFST model, to determine each modified spoken WFST model.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A text conversion method, comprising:
acquiring a target spoken text that comprises a non-spoken morpheme and a spoken morpheme, wherein the spoken morpheme is a type of morpheme that has one or more spoken morpheme characteristics, and wherein the spoken morpheme characteristics comprise an inserted morpheme, a repeated morpheme, and an amending morpheme;
determining an initial weighted finite-state transducer (WFST) model database according to a text training database by means of statistical learning, wherein the initial WFST model database comprises N initial spoken WFST models corresponding to N spoken texts, wherein the N initial spoken WFST models include first states, wherein each spoken text of the N spoken texts comprises the type of morpheme, and wherein an output of each state of the first states that corresponds to the type of morpheme is not empty;
determining a spoken morpheme characteristic WFST model database according to a spoken morpheme training database and the spoken morpheme characteristics and by means of statistical learning, wherein an output of each state in the spoken morpheme characteristic WFST model database that corresponds to the type of morpheme is empty;
modifying the N initial spoken WFST models in the initial WFST model database according to the spoken morpheme characteristic WFST model database to determine N modified spoken WFST models, wherein an output of each state of the N modified WFST models that corresponds to the type of morpheme is empty;
determining a target WFST model database, wherein the target WFST model database comprises the N modified spoken WFST models;
determining, from the target WFST model database, a target WFST model corresponding to the target spoken text, wherein an output of each state in the target WFST model that corresponds to the type of morpheme is empty, and wherein, for each state in the target WFST model that corresponds to the type of morpheme, an output of the state is the same as an input of the state; and
converting the target spoken text into a written text corresponding to the target spoken text by processing the target spoken text using the target WFST model, wherein the written text comprises the non-spoken morpheme and does not comprise the spoken morpheme.

2. The method according to claim 1, wherein modifying the N initial spoken WFST models in the initial WFST model database according to the spoken morpheme characteristic WFST model database to determine N modified spoken WFST models comprises:
identifying first morphemes in the N initial spoken WFST models by identifying each morpheme in the N initial spoken WFST models that corresponds to the type of morpheme;
determining, from the spoken morpheme characteristic WFST model database, a spoken morpheme characteristic WFST model for each of the first morphemes; and
combining each initial spoken WFST model with a corresponding spoken morpheme characteristic WFST model determined for the initial spoken WFST model.

3. A text conversion device, comprising:
a memory: and
a computer processor coupled to the memory and configured to:
acquire a target spoken text that comprises a spoken morpheme and a non-spoken morpheme, wherein the spoken morpheme is a type of morpheme that has one or more spoken morpheme characteristics, and wherein the spoken morpheme characteristics comprise an inserted morpheme, a repeated morpheme, and an amending morpheme;

determine an initial weighted finite-state transducer (WFST) model database according to a text training database by means of statistical learning, wherein the initial WFST model database comprises N initial spoken WFST models corresponding to N spoken texts, wherein the N initial spoken WFST models include first states, wherein each spoken text of the N spoken texts comprises the type of morpheme, and wherein an output of each state of the first states that corresponds to the type of morpheme is not empty;

determine a spoken morpheme characteristic WFST model database according to a spoken morpheme training database and the spoken morpheme characteristics and by means of statistical learning, wherein an output of each state in the spoken morpheme characteristic WFST model database that corresponds to the type of morpheme is empty;

modify the N initial spoken WFST models in the initial WFST model database according to the spoken morpheme characteristic WFST model database to determine N modified spoken WFST models, wherein an output of each state of the N modified WFST models that corresponds to the type of morpheme is empty;

determine a target WFST model database, wherein the target WFST model database comprises the N modified spoken WFST models;

determine, from the target WFST model database, a target WFST model corresponding to the target spoken text, wherein an output of each state in the target WFST model that corresponds to the type of morpheme is empty, and wherein, for each state in the target WFST model that corresponds to the type of morpheme, output of the state is the same as an input of the state; and convert the target spoken text into a written text corresponding to the target spoken text by processing the target spoken text using the target WFST model, wherein the written text comprises the non-spoken morpheme and does not comprise the spoken morpheme.

4. The device according to claim 3, wherein, to determine the N modified spoken WFST models, the computer processor is configured to:

identify first morphemes in the N initial spoken WFST models by identifying each morpheme in the N initial spoken WFST models that corresponds to the type of morpheme;

determine, from the spoken morpheme characteristic WFST model database, a spoken morpheme characteristic WFST model for each spoken morpheme of the first morphemes; and combine each initial spoken WFST model with a corresponding spoken morpheme characteristic WFST model determined for the initial spoken WFST model.

5. A text conversion device, comprising:

a non-transitory computer-readable medium configured to store a text training database and a spoken morpheme training database; and a computer processor coupled to the non-transitory computer-readable medium and configured to:

determine an initial weighted finite-state transducer (WFST) model database according to the text training database by means of statistical learning, wherein the initial WFST model database comprises N initial spoken WFST models corresponding to N spoken texts, each spoken text of the N spoken texts comprises a spoken morpheme, and output of a state of the spoken morpheme in each initial spoken WFST model of the N initial spoken WFST models is not empty;

determine a spoken morpheme characteristic WFST model database according to the spoken morpheme training database and characteristics of the spoken morpheme and by means of statistical learning, wherein an output of each state in the spoken morpheme characteristic WFST model database that corresponds to an inserted morpheme, a repeated morpheme, or an amending morpheme is empty;

modify the N initial spoken WFST models in the initial WFST model database according to the spoken morpheme characteristic WFST model database to determine N modified spoken WFST models, wherein an output of each state of the N modified WFST models that corresponds to the inserted morpheme, the repeated morpheme, or the amending morpheme is empty;

determine a target WFST model database, wherein the target WFST model database comprises the N modified spoken WFST models; and convert an acquired target spoken text into a written text corresponding to the acquired target spoken text by processing the acquired target spoken text using a target WFST model from the target WFST model database.

6. The device according to claim 5, wherein, to determine the N modified spoken WFST models, the computer processor is configured to:

determine the spoken morpheme in each initial spoken WFST model;

determine, from the spoken morpheme characteristic WFST model database, a spoken morpheme characteristic WFST model corresponding to the spoken morpheme in each initial spoken WFST model; and combine each initial spoken WFST model with a corresponding spoken morpheme characteristic WFST model determined for the initial spoken WFST model.

* * * * *